No. 653,988. Patented July 17, 1900.
W. G. DOTY.
CHEESE CUTTER.
(Application filed Oct. 4, 1899.)
(No Model.) 2 Sheets—Sheet 1.

WITNESSES: INVENTOR
W. G. Doty
BY
ATTORNEYS

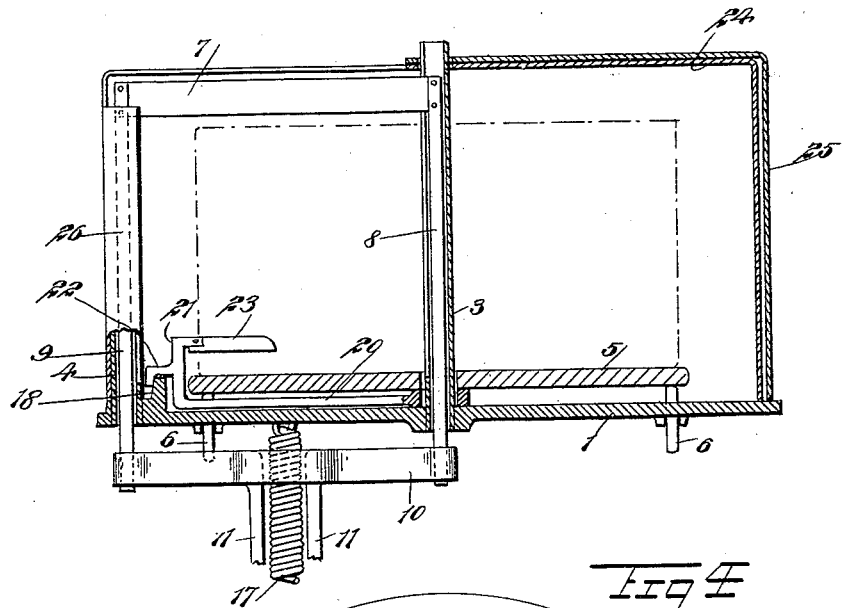

UNITED STATES PATENT OFFICE.

WALTER G. DOTY, OF MIDDLETOWN, OHIO.

CHEESE-CUTTER.

SPECIFICATION forming part of Letters Patent No. 653,988, dated July 17, 1900.

Application filed October 4, 1899. Serial No. 732,521. (No model.)

*To all whom it may concern:*

Be it known that I, WALTER G. DOTY, of Middletown, in the county of Butler and State of Ohio, have invented a new and Improved Cheese-Cutter, of which the following is a full, clear, and exact description.

This invention relates to improvements in machines for cutting cheese; and the object are to provide a machine of this character that shall be of simple and comparatively-inexpensive construction and by means of which any desired amount may be cut from a cheese by a very little power, and, further, to provide in the machine a simple means for determining the proper position for the cheese for cutting off a desired weight of cheese.

I will describe a cheese-cutter embodying my invention and then point out the novel features in the appended claims.

Reference is to be had to the accompanying drawings, forming a part of this specification, in which similar characters of reference indicate corresponding parts in all the figures.

Figure 1:
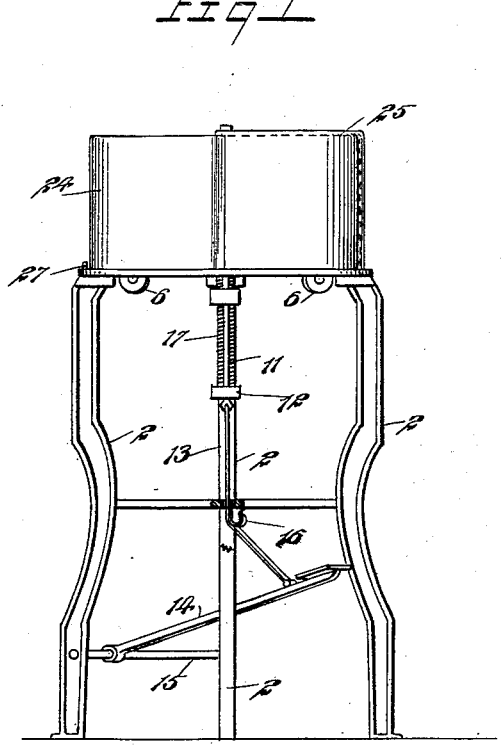
Figure 2:
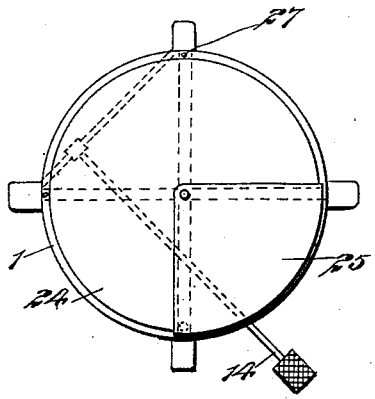

Figure is an elevation of a cheese-cutter embodying my invention. Fig. 2 is a top view thereof. Fig. 3 is a section on the line 3 3 of Fig. 4, and Fig. 4 is a plan view showing the cover as partly open to show the weight-registering mechanism.

Referring to the drawings, 1 designates a table-top supported on legs 2. Extended upward from the center of the table-top 1 is a longitudinally-slotted tube 3, and extended upward from the table-top near one edge is a longitudinally-slotted tube 4. The slots in the tubes 3 and 4 are located directly opposite each other. Mounted to rotate around the tube 3 and above the table-top 1 is a platform 5, upon which the cheese is designed to be placed, as indicated in dotted lines in Fig. 3. This platform is supported near its edge and moves on rollers 6, arranged in the table-top.

A cutting-knife 7 is movable up and down relatively to the posts 3 and 4. This knife 7 is mounted in a frame consisting of side rods 8 and 9, arranged, respectively, in the tubes 3 and 4, these tubes forming guides for the rods. The knife 7 will have its ends removably secured to the rods 8 and 9, so that said blade may be removed in order to place the cheese in position on the platform. The rods 8 and 9 extend down through the table-top and at their lower ends are connected by a cross-bar 10, from which rods 11 extend down to a cross-piece 12, which is connected, by means of a strap or similar connection 13, with a foot-pedal 14, mounted to swing on a cross-rod 15, secured to the legs of the table.

The strap 13, as shown, preferably extends around a roller 16, so that by backward pressure on the foot-pedal a direct downward motion will be imparted to the knife-carrying frame. The knife and its frame are restored to their upper positions upon releasing the foot-pedal by means of a spring 17, connected at its lower end to the cross-piece 12 and at its upper end to the under side of the table-top.

Supported on lugs 18, extended upward from the table-top near the outer edge of the platform 5, is a segmental plate 19, having graduations on its top for indicating pounds and fractions thereof.

Mounted to rotate on the tube 3 at the under side of the platform 5 is an arm 20, having at its outer end an upward extension 21, having a pointer 22 movable over the top of the graduated plate 19, and also mounted to swing on this upward extension 21 is a stop-plate 23.

The cover for the cheese consists of a portion 24, adapted to be arranged stationarily on the table, and a movable section 25, made in the shape of a quadrant and adapted to close a similarly-shaped opening in the section 24 of the cover. The section 25 is pivoted on the center tube 3, and the side walls of the section 24 at one end may be curved inward, as at 26, to engage partly around the guide-tube 4. Pins 27, extended upward from the table-top near its edge, serve to center and hold the cover when placed in position.

In operation when a cheese is placed upon the platform 4 it is to be understood that a hole must be formed through the center of the cheese, so that it may pass over the tube 3, and at this time the stop 23 is to be swung upward to a vertical position. Then the knife 7 is to be moved down through the cheese by means of foot-pressure on the pedal, and after the knife is returned to its upper position by means of the spring the cheese, with the platform, is to be turned, so that the stop 23 may be turned down into the cut. Assuming that the first slice of cheese to be cut is to weigh five pounds, the arm 20 is to be moved until the pointer 22 reaches the five-pound graduation on the plate 19. This may be done before the stop 23 is turned into the cut. When the box is in this position, the blade 7 is to be again drawn down through the cheese, and thus a slice of the proper weight will be cut out and may be removed. After cutting out the first slice it is obvious that the plate 23 may remain in its horizontal position and moved to any desired location on the graduated plate for cutting, as the cut edge of the cheese is to be moved up against this blade before again operating the knife to cut through the cheese.

In practice the plate 19 will be provided with a plurality of graduations—that is, it will be provided with graduations for cheeses of different weights. For instance, if a whole cheese weighs thirty-one pounds the scale for that weight of cheese must be employed.

Having thus fully described my invention, I claim as new and desire to secure by Letters Patent—

1. A cheese-cutter, comprising a rotary platform, a cutter, an arm mounted to rotate under the platform, a stop mounted to swing on the arm, and a position-indicator for the arm, substantially as specified.

2. A cheese-cutter, comprising a platform, a longitudinally-slotted tube extended through the center of the platform and on which it may rotate, a longitudinally-slotted tube extended upward at the edge of the platform, a frame guided in said tube, a cutter carried by the frame, and a stop-carrying arm mounted to swing on the center tube under the platform, substantially as specified.

3. A cheese-cutter, comprising a table, a platform mounted to rotate on said table, a cutter movable vertically with relation to the platform, an arm mounted for rotary motion underneath the platform, a stop mounted to swing on said arm, a pointer carried by the arm, and a graduated plate over which the pointer is movable, substantially as specified.

WALTER G. DOTY.

Witnesses:
WALTER S. HARLAN,
ARTHUR F. DOTY.